(12) United States Patent
Holman et al.

(10) Patent No.: US 9,004,504 B2
(45) Date of Patent: Apr. 14, 2015

(54) VEHICLE

(75) Inventors: Tim Holman, Nailsea (GB); Robert D'Aubyn, Bath (GB)

(73) Assignee: Horstman Defence Systems Limited, Bath (GB)

( * ) Notice: Subject to any disclaimer, the term of this patent is extended or adjusted under 35 U.S.C. 154(b) by 641 days.

(21) Appl. No.: 13/114,142

(22) Filed: May 24, 2011

(65) Prior Publication Data

US 2011/0291370 A1    Dec. 1, 2011

(30) Foreign Application Priority Data

May 25, 2010    (GB) .................................. 1008707.0

(51) Int. Cl.
| | |
|---|---|
| *B62D 55/06* | (2006.01) |
| *B60G 9/02* | (2006.01) |
| *B60G 7/00* | (2006.01) |
| *B62D 55/116* | (2006.01) |
| *B62D 61/12* | (2006.01) |
| *B60G 17/005* | (2006.01) |

(52) U.S. Cl.
CPC ............. B62D 55/116 (2013.01); B62D 61/12 (2013.01); B60G 17/005 (2013.01); *B60G 2204/47* (2013.01)

(58) Field of Classification Search
CPC ................................. B60G 17/005; B60G 3/02
USPC ................. 180/9.5; 280/28.5, 124.1, 124.116
See application file for complete search history.

(56) References Cited

U.S. PATENT DOCUMENTS

| | | | |
|---|---|---|---|
| 3,944,241 A | * | 3/1976 | Epelbaum ........................ 280/30 |
| 4,156,536 A | | 5/1979 | Brandstadter |
| 4,537,422 A | | 8/1985 | O'Rourke |
| 4,721,327 A | | 1/1988 | Chauveau et al. |
| 4,795,008 A | | 1/1989 | Joseph et al. |
| 4,858,736 A | | 8/1989 | Arnaud et al. |
| 5,105,918 A | | 4/1992 | Hagiwara et al. |

(Continued)

FOREIGN PATENT DOCUMENTS

| | | |
|---|---|---|
| DE | 3637387 A1 | 5/1988 |
| EP | 0450942 A2 | 10/1991 |

(Continued)

OTHER PUBLICATIONS

UK Search Report Issued on Aug. 23, 2010 for Application No. GB1008709.6, 1 page.

(Continued)

*Primary Examiner* — Joseph Rocca
*Assistant Examiner* — Jacob Knutson
(74) *Attorney, Agent, or Firm* — Gesmer Updegrove LLP

(57) ABSTRACT

A wheel 4 mounted on a vehicle body 2 by a suspension arm 6 can be retained in a raised position by a retaining mechanism 10. The retaining mechanism 10 comprises a latching element 12 which can be disposed in a deployed position by a control element 14. When the control element 14 is moved to a position corresponding to the deployed position of the latching element 12, the latching element 12 is resiliently displaceable towards the vehicle body 2, to allow the suspension arm 6 to rise, for example when the wheel 4 is driven over an obstacle. The latching element 12 can then move to the deployed position to prevent lowering of the arm 6, so retaining the wheel 4 in the raised position. All wheels of the vehicle may be moved to the raised position, so as to reduce the ride height of the vehicle.

17 Claims, 3 Drawing Sheets

(56) References Cited

U.S. PATENT DOCUMENTS

| | | | |
|---|---|---|---|
| 5,183,287 A | 2/1993 | VanSweden | |
| 5,324,065 A | 6/1994 | Derrien et al. | |
| 5,373,708 A * | 12/1994 | Dumoulin, Jr. | 62/457.7 |
| 6,250,409 B1 * | 6/2001 | Wells | 180/9.52 |
| 6,923,278 B2 * | 8/2005 | Mulhern et al. | 180/65.1 |
| 7,004,270 B2 * | 2/2006 | Hori et al. | 180/9.52 |

FOREIGN PATENT DOCUMENTS

| | | |
|---|---|---|
| EP | 0525957 A1 | 2/1993 |
| EP | 1418364 A1 | 5/2004 |
| GB | 1597922 A | 9/1981 |
| GB | 2313203 A | 11/1997 |
| JP | 62011156 A | 1/1987 |
| JP | 2009101864 A | 5/2009 |
| WO | 2004076211 A1 | 9/2004 |

OTHER PUBLICATIONS

UK Search Report Issued on Feb. 10, 2011 for Application No. GB1008705.4, 1 page.
UK Search Report Issued on Aug. 18, 2010 for Application No. GB1008708.8, 1 page.
UK Search Report Issued on Aug. 16, 2010 for Application No. GB1008706.2, 1 page.
UK Search Report Issued on Sep. 20, 2011 for Application No. GB 1108677.4, 1 page.
UK Search Report Issued on Aug. 17, 2010 for Application No. GB1008707.0, 1 page.

* cited by examiner

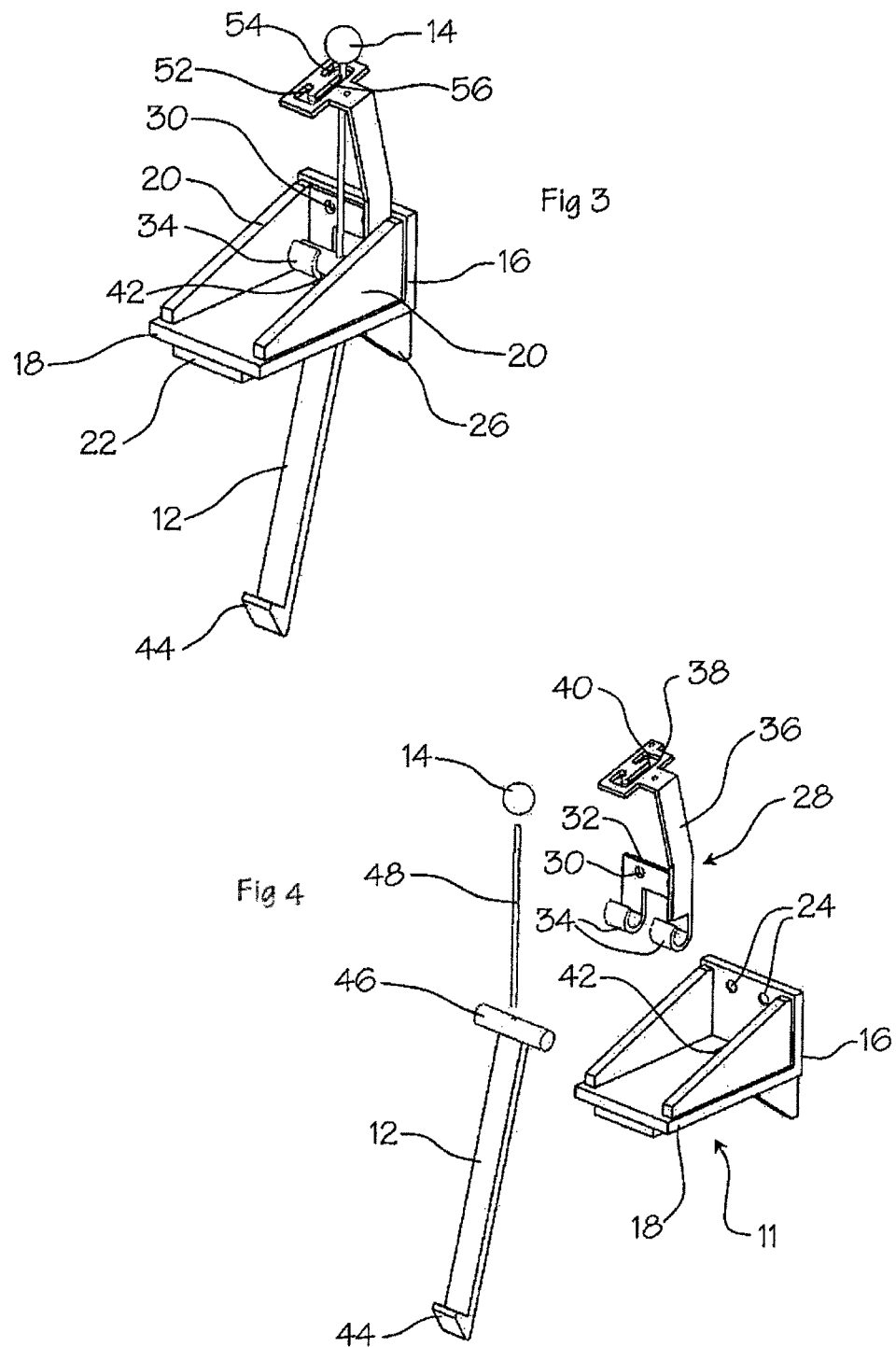

VEHICLE

PRIORITY

The present application claims the benefit of British Patent Application No. 1008707.0 filed on 25 May 2010, which is incorporated herein in its entirety.

BACKGROUND OF THE INVENTION

This invention relates to a vehicle and is particularly, although not exclusively, concerned with tracked vehicles.

A tracked vehicle has a track extending around a series of track guide wheels. At least some of the guide wheels support the weight of the vehicle body or hull on the section of the track which is in contact with the ground. In the context of this specification, a "ground-engaging wheel" may be a track guide wheel, which engages the ground indirectly via the track, or it may be a conventional wheel which directly engages the ground.

The track guide wheels which support the weight of the vehicle on the ground need to be connected to the vehicle body by a suspension mechanism which enables the track guide wheel to move upwardly and downwardly relatively to the body. It will be appreciated that, in some circumstances, this relative movement will consist of the track guide wheels moving upwardly and downwardly as they travel over irregularities in the ground. In other circumstances, for example if the vehicle is loaded or unloaded while stationary, it will be the vehicle body, rather than the wheels, which moves upwardly and downwardly relatively to the ground.

A known suspension system comprises an arm which is pivotable relatively to the body about a pivot axis. A wheel-supporting shaft is carried by the arm at a position away from the pivot axis, for supporting a track guide wheel. A resilient damping arrangement is accommodated within the arm for providing damped resilient resistance to deflection of the arm away from a static position in a direction corresponding to movement of the body towards the ground.

It is sometimes desirable to reduce the ride height of a vehicle, for example if the vehicle is to fit into a confined space. This can occur if the vehicle is to be transported by rail or aircraft. Ride height reduction can be achieved by complex and costly on-board height control systems. Alternatively, the suspension can be bound down by, for example, chains and chain binders, but these are time consuming and tedious to install.

SUMMARY OF THE INVENTION

According to the present invention there is provided a vehicle comprising a vehicle body and a wheel which is mounted on the vehicle body by a suspension mechanism having a component which rises and falls with respect to the body in operation of the suspension mechanism, a retaining mechanism being secured to the vehicle body and being operable to engage the component to retain the suspension component in a raised position.

The suspension component may be an arm which is pivotably mounted on the vehicle body. For example, the arm may be pivotably mounted on the vehicle body at one end of the arm, the wheel being carried at a position away from the pivotable mounting to the body, for example at the other end of the arm.

The retaining mechanism may comprise a latching mechanism, in which case the latching mechanism may have a latching element which is displaceable between an inoperative position, in which it is disposed out of the path of movement of the suspension component, and a deployed position, in which the latching element extends into the path of movement of the suspension component.

In the deployed position of the latching element, and with the suspension component at or above the raised position, the latching element may be engagable with the suspension component to prevent downward displacement of the suspension component below the raised position. The latching element may engage the suspension component at an engagement region on a downwardly facing surface of the suspension component. For example, the engagement region may comprise a recess in the lower surface of the suspension component, which the latching element engages in a manner which resists displacement of the latching element in a direction towards the inoperative position.

The latching element may be configured so that, when in the deployed position, the latching element is resiliently deflectable by the rising suspension component to permit passage of the suspension component towards the raised position.

The latching mechanism may comprise a control element which is connected to the latching element and is displaceable between operative and inoperative positions corresponding respectively to the deployed and inoperative positions of the latching element. The control element may be resiliently connected to the latching element, and may be movable between its operative and inoperative positions independently of the position of the latching element. The control element may be manually operable.

The latching element may be pivotably supported by a bracket fixed to the vehicle body. The bracket may comprise a bump, or jounce, stop for limiting rising movement of the suspension component.

The vehicle may be a tracked vehicle, the wheel being a track guide wheel.

The present invention also provides a retaining mechanism for a vehicle as defined above.

According to another aspect of the present invention, there is provided a method of retaining a wheel of a vehicle in a raised position with respect to a body of the vehicle, the wheel being mounted on the vehicle body by a suspension mechanism comprising a component which rises and falls with respect to the vehicle body in operation of the suspension mechanism, the method comprising:

(i) securing a retaining mechanism to the vehicle body, the retaining mechanism having a latching element which is engagable with the suspension component mechanism;
(ii) resiliently biasing the latching element towards a deployed position in which the latching element is in the path of the suspension component;
(iii) raising the wheel whereby the suspension component passes the latching element, thereby deflecting the latching element against the resilient bias until an engagement region of the suspension component is disposed above the latching element to allow the latching element to move to the deployed position; and
(iv) causing or allowing the wheel to fall, whereby the suspension component is retained in the raised position by the latching element.

The wheel may be raised by causing the vehicle to travel over a surface obstruction.

The present invention also provides a method of lowering the ride height of a vehicle in which all ground engaging wheels of the vehicle are raised in the manner defined above.

BRIEF DESCRIPTION OF THE DRAWINGS

For a better understanding of the present invention, and to show how it may be carried into effect, reference will now be made, by way of example, to the accompanying drawings, in which:—

FIG. 3 is a perspective view of the retaining mechanism;

FIG. 4 is an exploded view of the retaining mechanism;

DESCRIPTION OF EMBODIMENTS OF THE INVENTION

Figure 1:
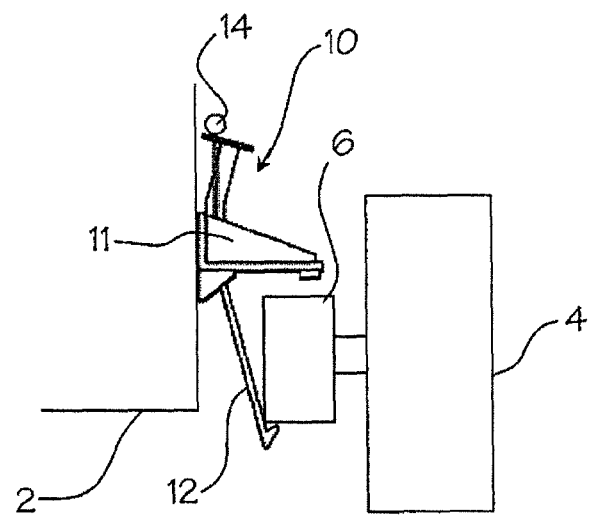
FIG. 1 is a diagrammatic view of a retaining mechanism acting between a vehicle body and a suspension mechanism.
Figure 2:
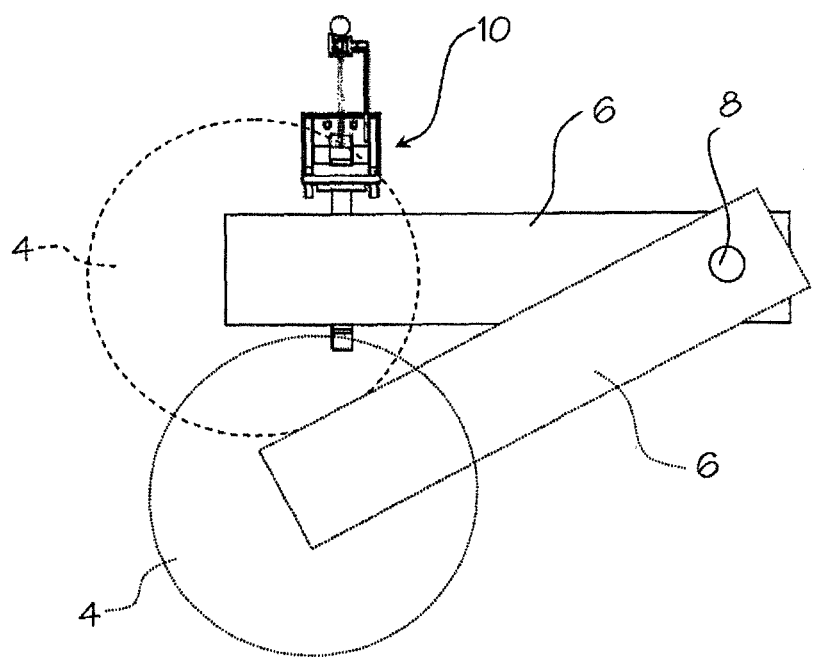
FIG. 2 is a side view of the retaining mechanism of FIG. 1.

FIG. 1 shows a vehicle body 2 and a wheel 4 which is mounted on the body 2 by a suspension mechanism which includes an arm 6 which is connected at one end to the vehicle body 2 by a shaft 8 (FIG. 2). The wheel 4 is carried at the other end of the arm 6. Resilient damping means (not shown) is provided for biasing the wheel 4 downwards with respect to the body 2, so as to support the vehicle body 2 off the ground.

A retaining mechanism 10 is provided for retaining the wheel 4 in a raised position (shown in dashed outline in FIG. 2) with respect to the vehicle body 2. The normal static position of the wheel 4 is shown in dotted outlined. The retaining mechanism 10 comprises a bracket 11 which is secured to the vehicle body 2, for example by welding, and which pivotably supports a latching element 12 which is operated by a control element in the form of a knob 14. As shown in FIG. 1, the retaining mechanism can be deployed to cause the latching element 12 to engage the suspension arm 6 to retain it in the raised position, as shown in solid outline in FIG. 2, against the downward force imposed by the resilient damping means.

The retaining mechanism 10 is shown in more detail in FIGS. 3 and 4. The bracket 11 comprises an attachment plate 16 from which extends an arm 18, braced by a pair of fillets 20. A bump stop pad 22, of resilient material such as rubber, is bonded to the underside of the arm 18. The attachment plate 16 is provided with two tapped holes 24. A pair of strengthening ribs 26 is provided on the lower face of the arm 18, adjacent the plate 16.

A mounting element 28 is secured to the plate 16 by bolts (not shown) passing through holes 30 in the mounting element 28 into the tapped holes 24. The mounting element 28 is formed from sheet metal and comprises a fixing plate 32 provided with aligned bearing sockets 34. A limb 36 extends upwardly from the fixing plate 32 and carries a guide plate 38 in which a guide groove 40 is formed.

The arm 18 of the bracket 11 has a rectangular hole 42 at a position close to the attachment plate 16. When the mounting element 28 is in position against the plate 16, the bearing sockets 34 sit on the plate 18, one on each side of the hole 42.

The latching element 12 is in the form of an elongate strip having an engagement head 44 at one end and a pivot shaft 46 at the other. The pivot shaft 46 sits within the bearing sockets 34, and a spring rod 48 extends from the bearing shaft 46, through the guide groove 40, and terminates at the control knob 14. The latching element 12 extends from the pivot shaft 46 through the hole 42 to project below the bracket 11. Manipulation of the control knob 14 by hand enables the latching element 12 to be displaced between a deployed position, shown in FIG. 1, and an inoperative position, in which the latching element 12 is displaced to the left in FIG. 1, to lie close to, or in contact with, the side of the vehicle body 2.

In normal operation of the vehicle, the mounting element 28, with the latch unit comprising the latching element 12, the spring rod 48 and the knob 14, are removed from the bracket 11, which remains fixed to the vehicle body 2. Thus, the bracket 11 serves as a conventional bump stop, with any impact between the suspension arm 6 and the bracket 11 being damped by the pad 22.

If a reduced ride height for the vehicle is required, for example to fit within a transport enclosure such as a rail wagon or aircraft, the mounting element 28 and the latch unit 12, 48, 50 are installed in the bracket 11, and secured by bolts passing through the holes 30 in the mounting element 28 into the tapped holes 24 in the plate 16. While the vehicle is stationary, the control knob is manipulated in the guide groove 40 to move the latching element 12 into the deployed position shown in FIG. 3. It will be appreciated that the guide groove 40 is substantially in the shape of a C with end portions 52, 54 directed towards each other, corresponding to the respective deployed and inoperative positions of the latching element 12, and a transfer slot 56 enabling movement of the spring rod 48 between the end portions 52, 54.

If the spring rod 48 is moved into the "deployed" end portion 54 while the vehicle is at its normal static ride height, it is possible that full movement of the latching element 12 to the deployed position will be obstructed by the suspension arm 6. The spring rod 48 will bend to accommodate this, and will, as a result, apply a biasing torque to the latching element 12, pressing it against the suspension arm 6.

Figure 5:
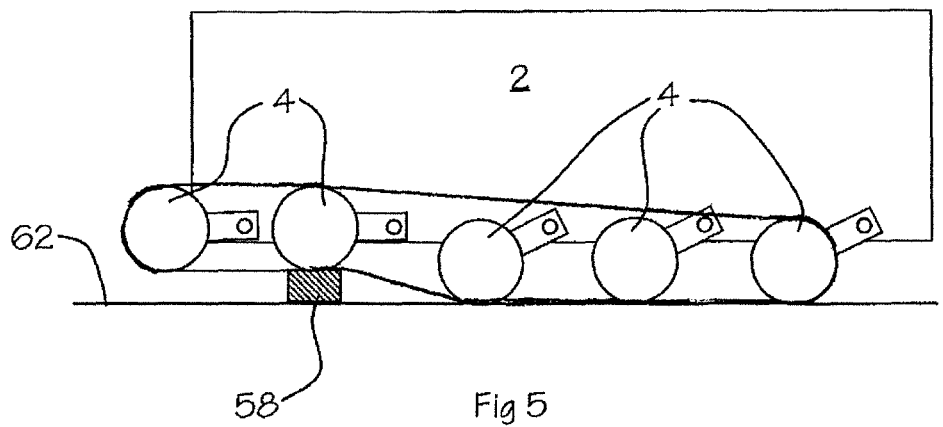
FIG. 5 shows a process for raising individual wheels of a vehicle.

As shown in FIG. 5, if the vehicle is then driven over an obstacle, as indicated schematically in FIG. 5, each wheel 4 in turn will be raised with respect to the vehicle body. This will cause the suspension arm 6 of each wheel 4 to travel past the engagement head 44 of the latching element 12 until the engagement head 44 is able to snap outwardly with respect to the vehicle body 2, as shown in FIG. 1. As the wheel 4 passes the obstacle 58, an engagement region on the underside 60 of the suspension arm 6 engages the engagement head 44 to prevent further descent of the suspension arm 6, so preventing the wheel 4 from returning to the ground surface 62. As mentioned above, the vehicle may be a tracked vehicle 2, the wheel being a tracked wheel.

It will be appreciated that, once the spring rod 48 has been moved to the "deployed" end portion 54, the subsequent latching of the suspension arm 6 by the latching element 12 happens automatically as the vehicle is driven over the obstacle 58. There is no need for the operator to manipulate the control knob 14 while the latching process takes place. This avoids the possibility of injury to the operator during the latching process.

The engagement region may comprise a recess for positive retention of the engagement head 44. It will be appreciated from FIGS. 1, 3 and 4 that the engagement head 44 has a "barbed" configuration, including an upper surface 64 which is inclined downwardly in the inboard direction when the latching element 12 is in the deployed position. When engaged with the recess in the suspension arm 6, this configuration avoids any accidental inboard movement of the latching element 12 which could result in release of the suspension arm 6.

Downward loading applied to the latching element 12 by the suspension arm 6 is transferred through the bearing sockets 34 to the arm 18, and thence to the vehicle body 2. The mounting element 28 and the bolts in which secure it to the bracket 11 therefore do not bear any major loads.

Figure 6:
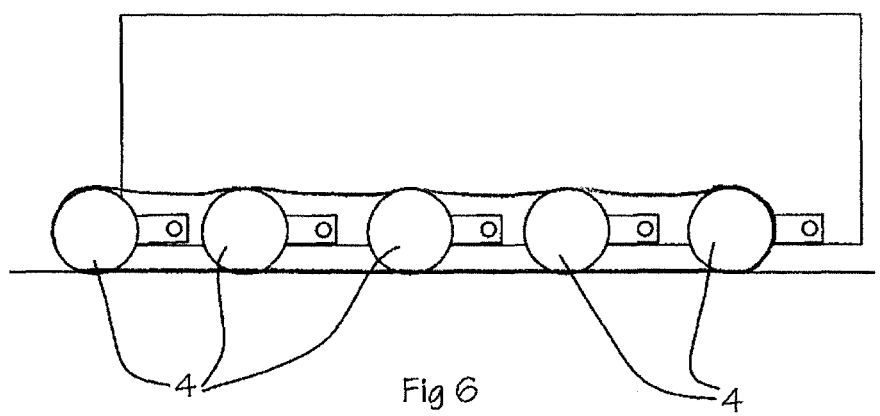
FIG. 6 corresponds to FIG. 5 but shows the vehicle with all wheels raised, so that the ride height of the vehicle is reduced.

As can be appreciated from FIG. 6, if a retaining mechanism as shown in FIGS. 3 and 4 is deployed at each of the wheels 4, then, once the wheels have travelled over the obstacle 58, all of them will be retained in their raised position, with the result that the vehicle as a whole will have a reduced ride height.

In order to return the vehicle to its normal ride height, or to return an individual wheel to normal operation, the control knob 14 is moved to take the spring rod 48 to the "release" end portion 52 of the groove 40. Owing to the resilience of the spring rod 48, this can be accomplished without any change in the position of the latching element 12, which remains in positive engagement with the suspension arm 6 because of the locking effect between the recess and the engagement head 44. Operation of the control knob 14 can be done while the vehicle is stationary. The vehicle is then driven again over a suitable obstacle 58 which causes the suspension arm 6 to rise slightly (for example by 25 mm) from the raised position, allowing the engagement head 44 to be released from the recess in the suspension arm 6 so that the latching element 12 will spring back, under the resilience of the spring arm 48, to the inoperative position. This releases the suspension arm 6 so that, once the obstacle 58 is passed, the wheel 4 can return to its normal position with respect to the vehicle body 2. As with the latching process, the unlatching process occurs automatically, without operator involvement while the vehicle is moving and the suspension arm 6 is released.

Normal operation of the vehicle can continue with the latching unit 12, 48, 50 installed on the bracket 11, with the latching element 12 retained in the inoperative position by the positioning of the spring rod 48 in the "release" end portion 52 of the groove 40. In this condition, the spring rod 48 may be lightly stressed to bias the latching element 12 against the vehicle body 2. However, in order to avoid accidental latching of the suspension arm 6, it may be desirable to remove the latching unit 12, 48, 50 and the mounting element 28 from the vehicle. This can be accomplished simply by removing the bolts from the tapped holes 24 in the plate 16.

A secondary lock device (not shown) may be provided for retaining the spring rod 48 in the desired end portion 52, 54. The secondary lock device may, for example, comprise a lever which can be positioned over the guide plate 38 and secured in position with a pin and clip.

The invention provides the ability to alter the ride height of the vehicle, or to raise one or more of the wheels from the ground, in a "remote" manner, that is without operator involvement after the control knob has been set to the desired position.

Although the invention has been described with reference to FIGS. 5 and 6 in the context of reducing the ride height of the vehicle, it will be appreciated that the retaining mechanism may be provided, or operated to move the latching element 12 to the deployed position, on only some of the wheels, or even on only one wheel, so that one or more of the wheels are moved to the raised position while the remaining wheels continue to support the vehicle on the ground at the normal ride height. The raised wheels can then be serviced or replaced, or other maintenance operations can be conducted, without the requirement for any jacking mechanism.

It will be appreciated that, although the latching device has been described as engaging the underside of the suspension arm 6, it could alternatively engage a downwardly facing surface of a part of the arm 6 situated above the underside, for example a suitably profiled projecting shoulder provided on the side of the arm 6 facing towards the vehicle body 2.

The invention claimed is:

1. A vehicle comprising a vehicle body and a wheel which is mounted on the vehicle body by a suspension mechanism having a suspension component which rises and falls along a path of movement with respect to the body in operation of the suspension mechanism, and a retaining mechanism being secured to the vehicle body and being operable to retain the suspension mechanism in a raised position, wherein the retaining mechanism includes a latching mechanism, and wherein the latching mechanism includes a latching element that is displaceable between an inoperative position, in which the latching mechanism is situated out of the path of movement of the suspension component, and a deployed position in which the latching element extends into the path of movement of the suspension component.

2. A vehicle as claimed in claim 1, in which the suspension component is an arm which is pivotably mounted on the vehicle body.

3. A vehicle as claimed in claim 2, in which the arm is pivotably mounted on the vehicle body at one end of the arm, the wheel being mounted on the arm at a position spaced from the vehicle body.

4. A vehicle as claimed in claim 1, in which, in the deployed position of the latching element with the suspension component at or above a raised position, the latching element is engagable with the suspension component to prevent downward displacement below the raised position.

5. A vehicle as claimed in claim 4, in which the latching element is engagable with an engagement region on a downwardly facing surface of the suspension component.

6. A vehicle as claimed in claim 5, in which the engagement region comprises a recess in the downwardly facing surface.

7. A vehicle as claimed in claim 6, in which the latching element and the recess are configured to resist displacement of the latching element in the direction towards the inoperative position when the latching element engages the recess.

8. A vehicle as claimed in claim 1, in which the latching element is configured so that, in the deployed position, the latching element is resiliently deflectable by the rising suspension component to permit passage of the suspension component to the raised position.

9. A vehicle as claimed in claim 1, in which a control element is connected to the latching element and is displaceable between operative and inoperative positions corresponding to the deployed and inoperative positions of the latching element.

10. A vehicle as claimed in claim 9, in which the control element is resiliently connected to the latching element.

11. A vehicle as claimed in claim 10, in which the control element is movable between the operative and inoperative positions independently of the position of the latching element.

12. A vehicle as claimed in claim 10, in which the control element is manually operable.

13. A vehicle as claimed in claim 1, in which the latching element is pivotably supported by a bracket fixed to the vehicle body.

14. A vehicle as claimed in claim 13, in which the bracket comprises a bump stop for limiting rising movement of the suspension component.

15. A vehicle as claimed in claim 13, in which the latching element is pivotably carried by a mounting element which is removably secured to the bracket.

16. A vehicle as claimed in claim 1, which is a tracked vehicle, the wheel being a track guide wheel.

17. A vehicle comprising:

a vehicle body;

a wheel;

a suspension mechanism comprising a suspension arm pivotably mounted to the vehicle body at one end of the suspension arm, the wheel being mounted on the suspension arm at a position spaced from the vehicle body such that the wheel is mounted on the vehicle by the suspension mechanism, wherein the suspension arm rises and falls along a path of movement with respect to the vehicle body in operation of the suspension mechanism; and a latching mechanism secured to the vehicle body and operable to retain the suspension arm in a raised position, the latching mechanism comprising a latching element which is displaceable between an inoperative position, in which the latching mechanism is situated out of the path of movement of the suspension arm, and a deployed position, in which the latching element extends into the path of movement of the suspension arm;

wherein the latching element is configured so that, in the deployed position, the latching element is resiliently deflectable by the rising suspension arm to permit passage of the suspension arm to the raised position; and wherein, with the suspension arm at or above the raised position and the latching element in the deployed position, the latching element is engagable with the suspension arm to prevent downward displacement of the suspension arm below the raised position.

\* \* \* \* \*